United States Patent [19]

Ripert

[11] Patent Number: 5,410,891
[45] Date of Patent: May 2, 1995

[54] UNIVERSALLY-MOUNTABLE AIR COOLER APPARATUS INCLUDING MEANS FOR COLLECTING AND EVACUATING CONDENSATES

[75] Inventor: Michel E. Ripert, Loriol, France

[73] Assignee: Societe Anonyme: Thermofroid, Loriol, France

[21] Appl. No.: 190,076

[22] PCT Filed: Jul. 29, 1992

[86] PCT No.: PCT/FR92/00742
§ 371 Date: Feb. 1, 1994
§ 102(e) Date: Feb. 1, 1994

[87] PCT Pub. No.: WO93/03317
PCT Pub. Date: Feb. 18, 1993

[30] Foreign Application Priority Data
Aug. 2, 1991 [FR] France ............... 91 10110

[51] Int. Cl.⁶ .......................................... R25D 21/14
[52] U.S. Cl. ................................. 62/286; 62/288; 62/239
[58] Field of Search ............... 62/272, 275, 285, 286, 62/288, 290, 291, 239; 165/70, 913

[56] References Cited

U.S. PATENT DOCUMENTS

| 3,383,878 | 5/1968 | Booth | 62/285 |
| 3,989,104 | 11/1976 | Newton | 165/111 |
| 4,129,013 | 12/1978 | Hine | 62/285 |
| 4,474,232 | 10/1984 | Wright et al. | 165/137 |

Primary Examiner—Henry A. Bennett
Assistant Examiner—William C. Doerrler
Attorney, Agent, or Firm—Bacon & Thomas

[57] ABSTRACT

The cooler apparatus of the invention is designed to be mounted on an enclosure (2) and it comprises a housing (3) internally provided with fixed structure for collecting (12, 22, 26, 37, 39) and for evacuating (15, 24, 34, 35) condensates in all mounting positions of the cooler apparatus. The apparatus is applicable to cooling the cab of a vehicle.

9 Claims, 6 Drawing Sheets

UNIVERSALLY-MOUNTABLE AIR COOLER APPARATUS INCLUDING MEANS FOR COLLECTING AND EVACUATING CONDENSATES

TECHNICAL FIELD

The present invention relates to apparatuses or devices designed to cool the air contained in a room or an enclosure (in the wide sense), and it is particularly concerned with cooler apparatuses suitable for being mounted on vehicles, in particular for the cabs of earth-moving vehicles.

PRIOR ART

In general, a cooler apparatus comprises a housing in which there are mounted a heat exchanger having a cooling fluid passing therethrough, and a fan for circulating air. The housing of the apparatus may be organized to have an inlet for sucking in air to be treated and an outlet for delivering treated air. The inlet and the outlet of the housing then communicate with openings formed in the enclosure on which the cooler apparatus is to be mounted.

Given that as the heat exchanger is at a temperature lower than that of the air contained in the cab, moisture is deposited in the form of condensation water or frost on the surfaces of the heat exchanger. The condensates that result from air passing through the heat exchanger are generally collected by means of a recovery tray disposed beneath the heat exchanger.

Depending on the structural characteristics of an enclosure, such a cooler apparatus is installed relative thereto either above, or below, or on one side, and either inside or outside the cab. To be able to satisfy the various possible mounting positions, it is the practice to manufacture four types of cooler apparatuses each capable of collecting and evacuating condensates.

Furthermore, when the cooler apparatus is fitted to a vehicle that is liable to be tilted, it is clear that condensates cannot be collected and evacuated using conventional devices. Furthermore, in order to avoid damaging electronic equipment or the enclosures to be treated, it is essential that no liquid (water, cooling liquid, etc.) can escape from the treatment box via the openings for taking up or delivering up treated air.

There is thus a need for a cooler apparatus capable of being adapted to various different positions while being capable in each position of collecting and evacuating condensates.

SUMMARY OF THE INVENTION

The present invention therefore seeks to achieve the above objects by proposing a cooler apparatus capable of collecting and evacuating condensates whatever the position in which the cooler apparatus is mounted, and regardless of whether it is mounted on the outside or the inside of an enclosure (in the wide sense).

To achieve this object, the cooler apparatus of the invention comprises a housing provided internally with fixed means for collecting and evacuating condensates in any position of the cooler apparatus when mounted on or in the enclosure.

Implementing such collecting and cooling means in association with the housing of the cooler apparatus makes it possible to obtain a cooler unit that is universally mountable and that is compact.

According to an advantageous characteristic, the means for collecting and evacuating condensates are constituted at least by:
a chassis:
  lying in a plane substantially parallel to a mounting axis;
  having the heat exchanger standing proud thereon;
  organized to include a network of condensate recovery channels opening out to at least one condensate evacuation orifice referred to as a "horizontal position" orifice; and
  provided with a condensate deflector extending in sloping manner towards the inside of the housing, between the heat exchanger and the suction inlet;
and a sloping wall:
  standing proud from the chassis to a height that is not less than the height of the heat exchanger and in the opposite direction to the deflector; and
  fitted at the chassis with an evacuation orifice referred to as a "vertical position" orifice.

BRIEF DESCRIPTION OF THE DRAWINGS

Various other characteristics appear from the following description made with reference to the accompanying drawings which show embodiments of the invention as non-limiting examples.

BEST METHOD OF PERFORMING THE INVENTION

Figure 1:
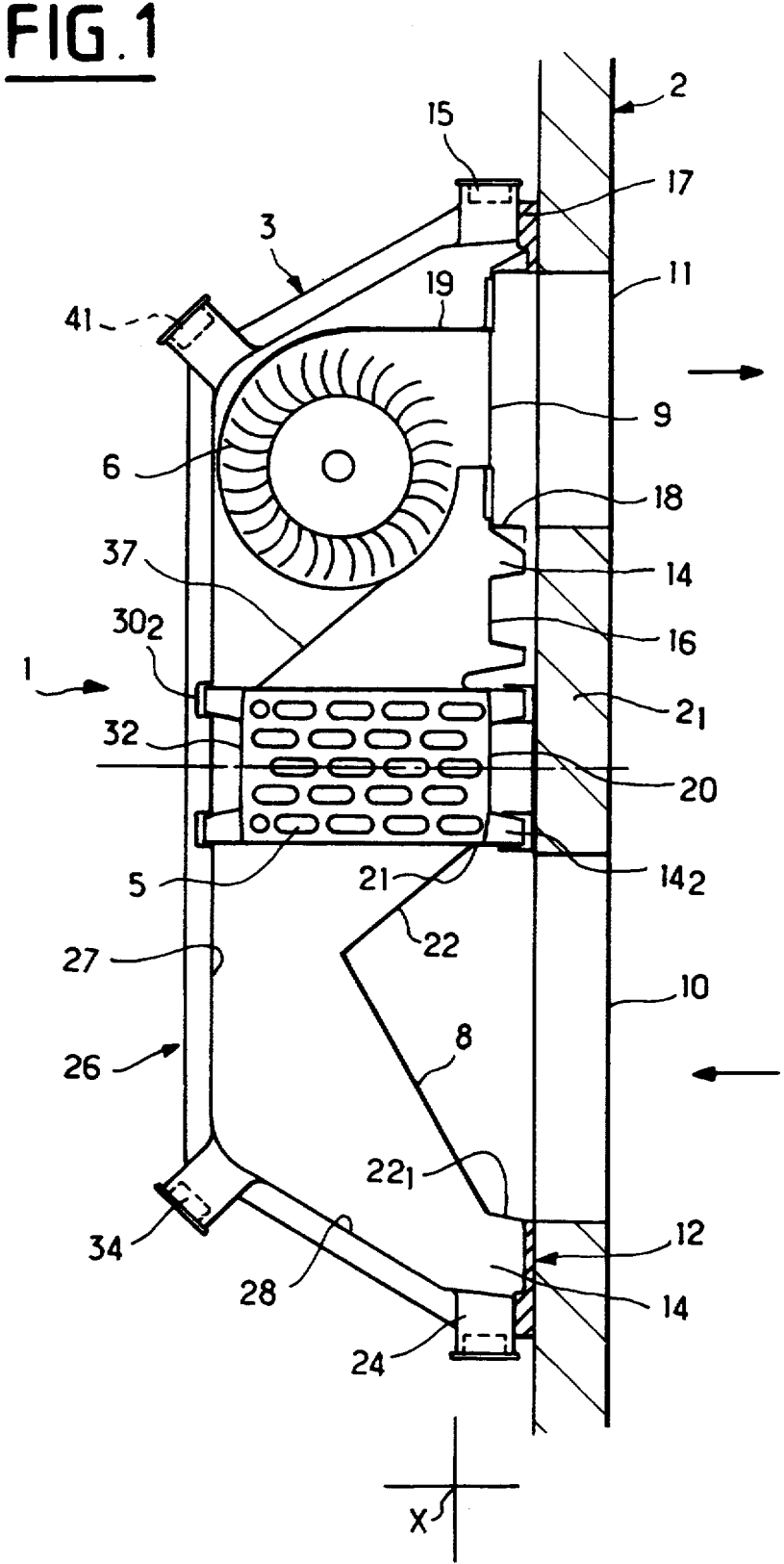
FIG. 1 is a section in elevation showing a cooler apparatus of the invention.
Figure 2:
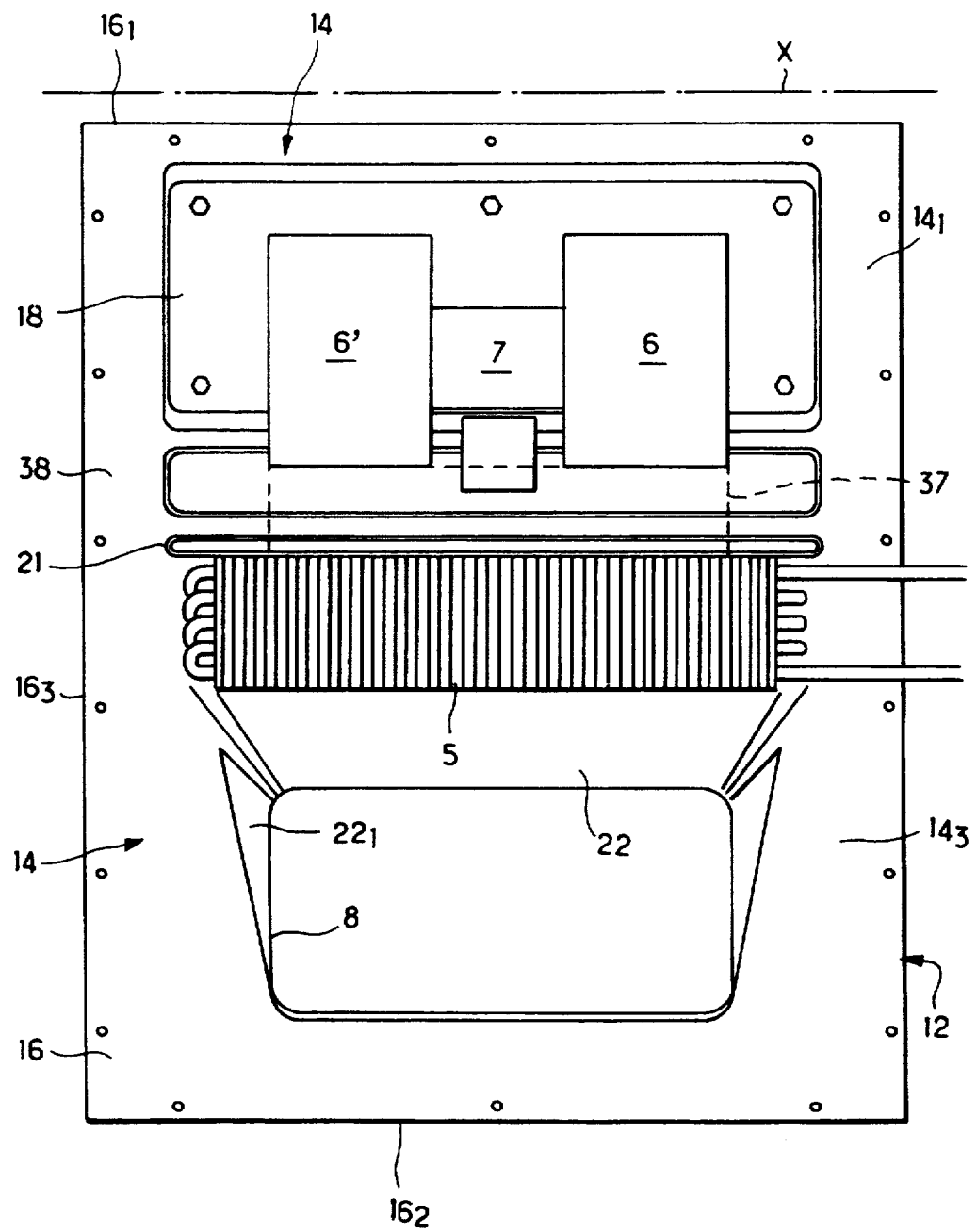
FIG. 2 is a view of the apparatus without its protective cover, showing the various elements mounted inside the apparatus.

FIGS. 1 and 2 show a cooler apparatus 1 of the invention for cooling the air in a room or an enclosure 2 constituting, for example, a cab 2 of a vehicle, in particular earth-moving equipment. The cooler apparatus 1 comprises a housing 3 containing a heat exchanger 5 through which cooling fluid circulates, and also including at least one, and in the example shown two, fans 6, 6' for ensuring that air circulates between the apparatus 1 and the inside volume of the enclosure 2.

The fans 6 and 6' are driven by means of an electric motor 7 which is advantageously mounted between the two fans 6 and 6', as can be seen more clearly in FIG. 2. The housing 3 is organized to include a suction inlet 8 and a delivery outlet 9 for treated air. The inlet 8 and outlet 9 are located to coincide with respective openings 10 and 11 made through the wall $2_1$ of the enclosure, so as to put the inside volume of the enclosure into communication with the inside volume of the cooler apparatus 1.

Figure 3:
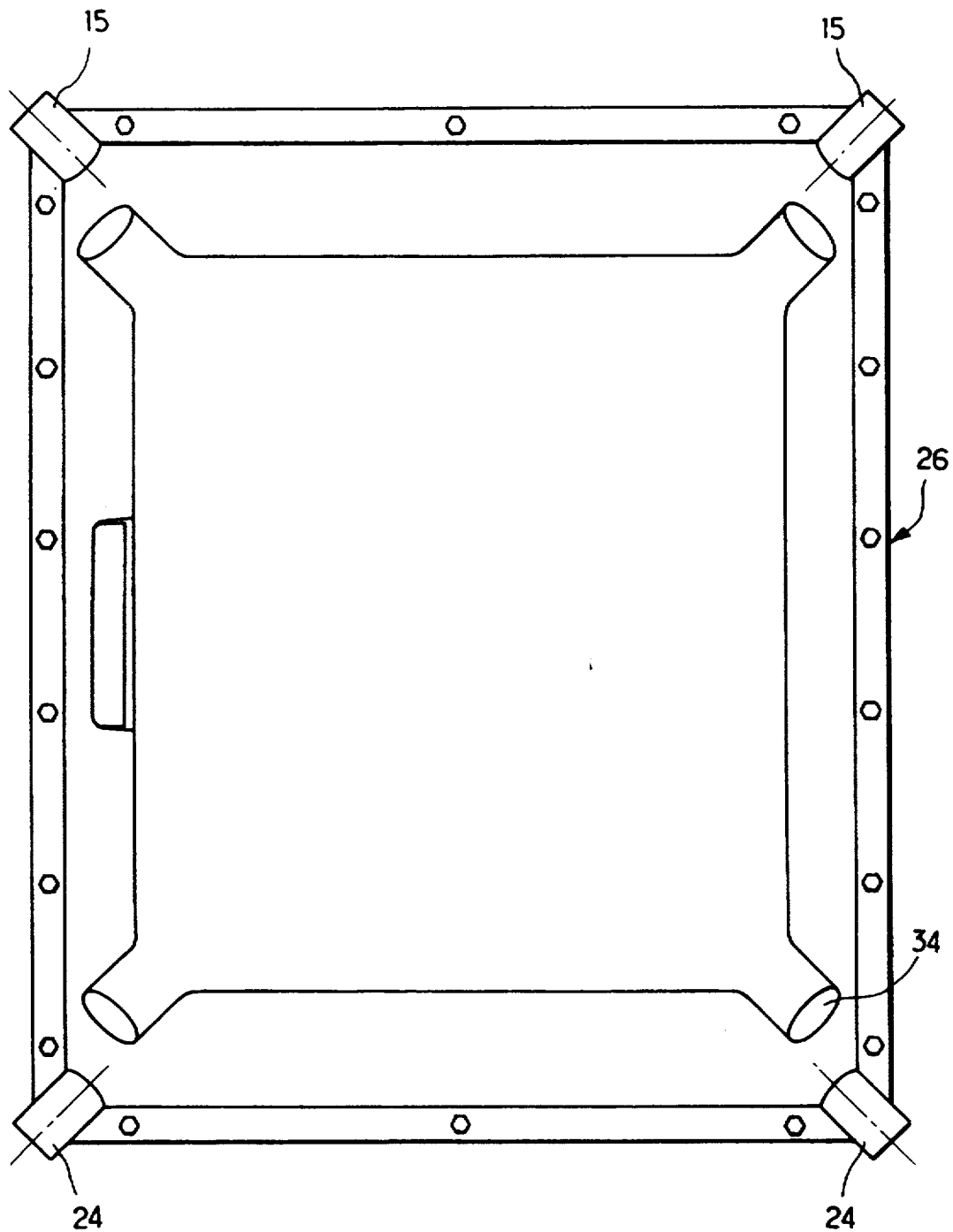
FIGS. 3 and 4 are plan views showing the protective cover of the apparatus, respectively showing each of its main faces.
Figure 4:
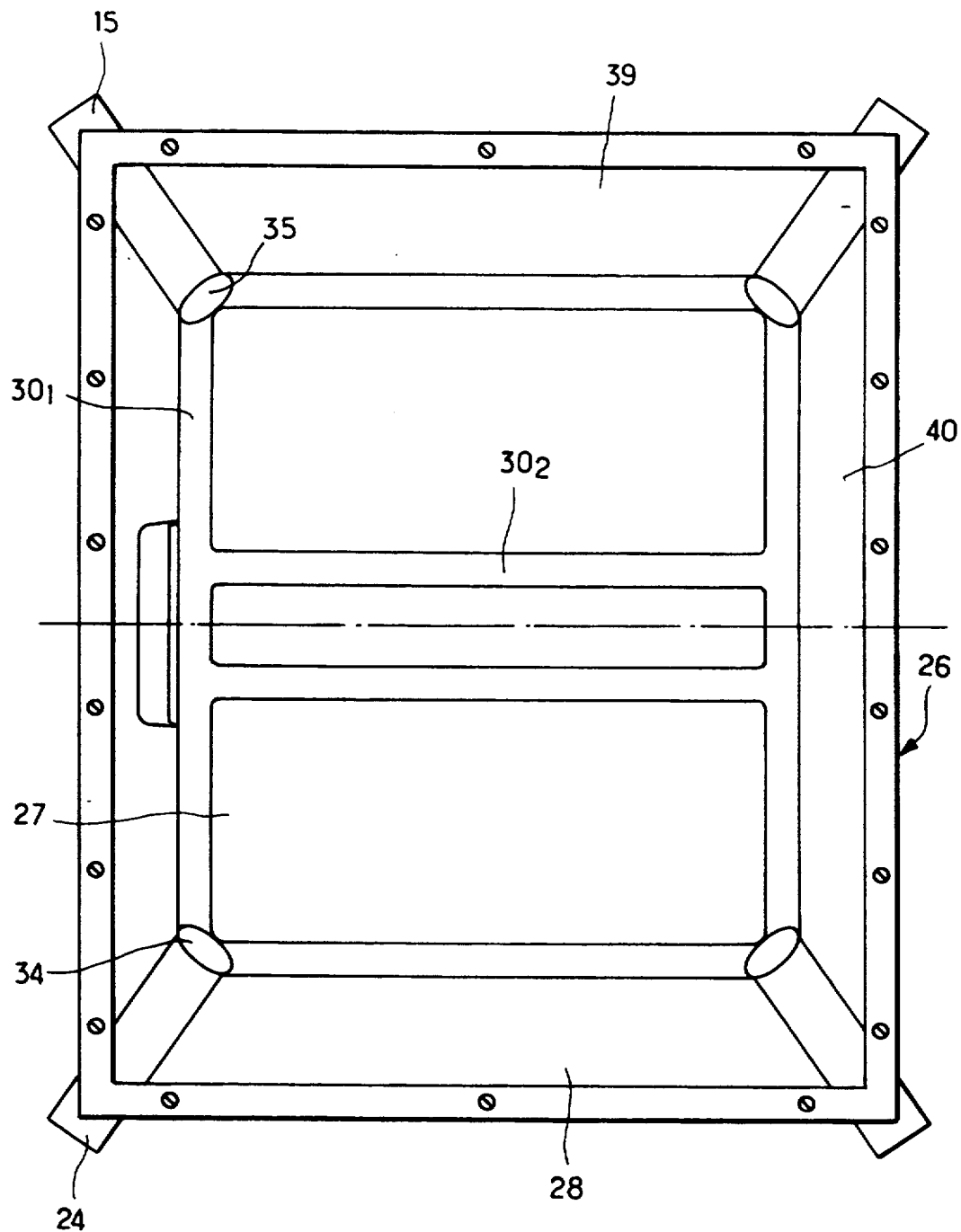

According to the invention, the housing 3 is provided internally with fixed means for collecting and evacuating condensates in at least several, and advantageously in all, positions in which the apparatus may be installed on the enclosure. The means for collecting and evacuating condensates are constituted, in particular, by a chassis 12 occupying a plane that is substantially parallel to an installation axis X used by way of example in the description below. Relative to the chassis 12, the heat exchanger 5 stands proud to a determined height and extends transversely inside the apparatus 1, substantially in its central region. The chassis 12 is organized to include a network of channels 14 for recovering condensates and opening out to at least one, and in the example shown two, evacuation orifices 15 referred to as "horizontal position" orifices (FIGS. 3 and 4). These orifices 15 enable condensates to be evacuated when the apparatus 1 occupies a horizontal position, as can be seen more clearly from FIG. 5A.

In the example shown, the chassis 12 is constituted by a plate 16 and a protective lid 17 fitted with passages corresponding to the suction inlet 8 and to the air outlet 9. A soleplate 18 for engaging and supporting the fans 6 and 6' and the motor 7 is interposed between the plate 16 and the lid 17. The plate 16 is assembled in sealed manner to the soleplate 18 which projects from the plate 16 between the transverse edge $16_1$ of the plate and the heat exchanger 5. The soleplate 18 enables the outlet duct 19 of each fan 6, 6' to be mounted, thus defining the delivery outlet 9. Each duct 19 is mounted in sealed manner on the projecting soleplate 18 which, relative to the plate 16 defines a peripheral channel $14_1$.

The plate 16 is shaped to include a heel 20 against which the heat exchanger 5 bears and serving to define transverse channels $14_2$ on either side that are directly in line with the heat exchanger 5 and at a distance from the longitudinal edges $16_3$ of the plate. The plate 16 also includes abutments 21 extending from either side of the channels $16_2$ and serving to center the heat exchanger 5. The channels $14_2$ are in communication with the channels $14_1$ for the purpose of evacuating condensates towards the transverse edge $16_1$ in which the orifices 15 are positioned.

Figure 5:
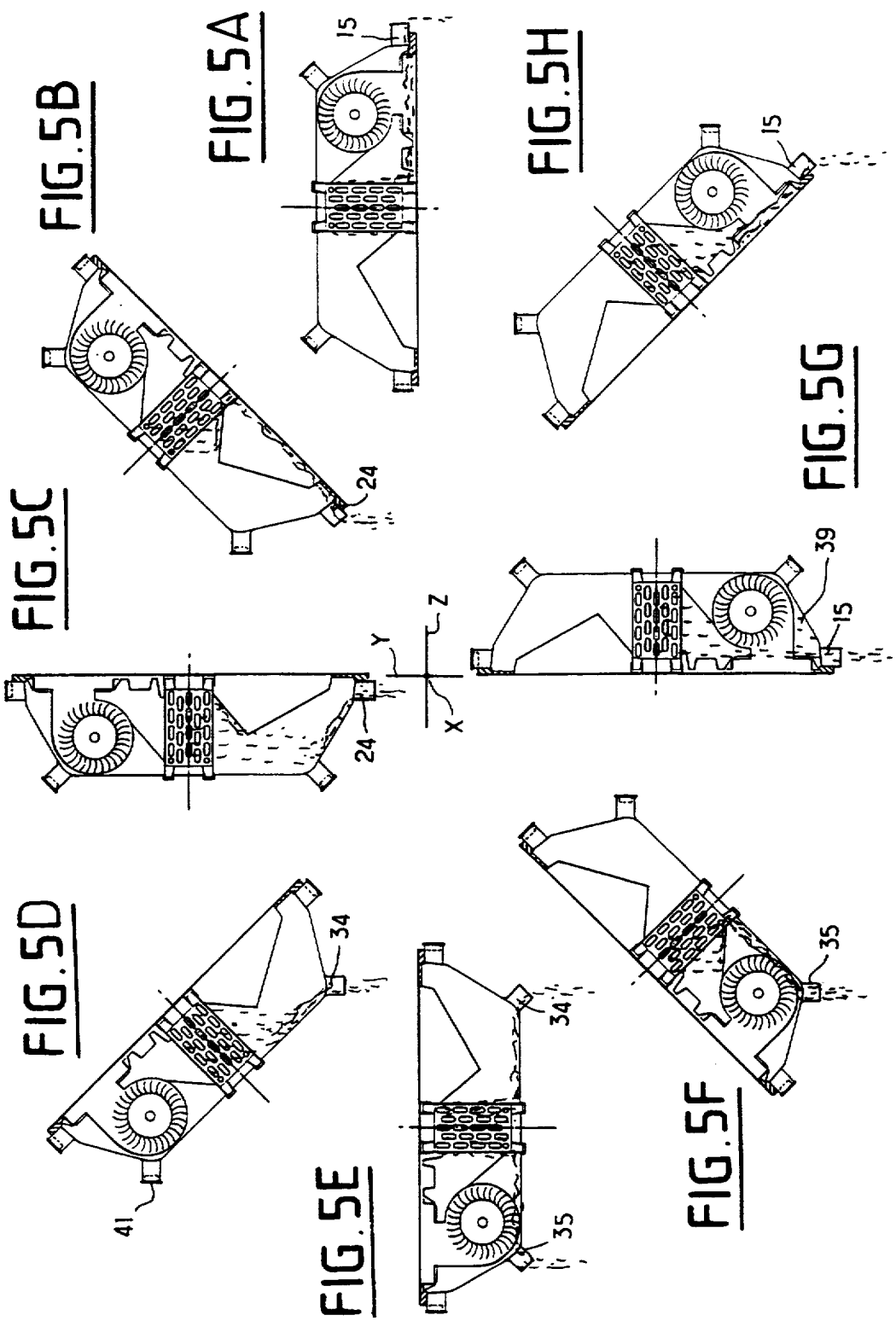
FIGS. 5A to 5H are views showing various possible positions in which the apparatus of the invention can be mounted relative to a given installation axis.

The plate 16 is also provided with a condensate deflector 22 extending in inclined manner towards the inside of the housing between the heat exchanger 5 and the suction inlet 8, going towards the transverse edge $16_2$ of the plate opposite from its edge $16_1$. The deflector 22 extends over a determined height so as to prevent condensates escaping via the suction inlet 8 when the apparatus is in a given position, e.g. that shown in FIG. 5B, and defined between the horizontal position (FIG. 5A) and the vertical position (FIG. 5C). When the apparatus is in an inclined position, e.g. at less than 45°, the deflector 22 directs the condensates towards the plate 16. As shown by wavy lines in FIG. 5B, the condensate flows into channels $14_3$ defined on either side of the opening 8 which is surrounded by a peripheral rim $22_1$ extending the deflector 22 and projecting from the plate 16. These channels $14_3$ which communicate with the channels $14_1$ and $14_2$ serve to convey the condensates towards the edge $16_2$ of the plate where at least one, and for example two, condensate evacuation orifices 24 are disposed, which orifices are referred to as "vertical position" orifices (FIGS. 5B and 5C).

Preferably, the plate 16 is made of molded plastics material and is shaped to present the various channels $14_1$, $14_2$, and $14_3$ as defined by the projecting portions 18, 20, 21, and $22_1$. Naturally, the plate 16, the lid 17, and the soleplate 18 could be constituted as a single part, thereby making a one-piece chassis.

The collecting and evacuating means of the invention are also constituted by a cover 26 having a plane central portion 27 extending in a plane that is substantially parallel to the plane containing the chassis 12 and that is located on the side of the heat exchanger 5 opposite from its side occupied by the chassis 12. The cover 26 includes a sloping wall 28 extending the central portion 27 and going towards the transverse edge $16_2$ of the plate 16 in a direction opposite to that taken by the deflector 22. At each of its corners, this sloping wall 28 is designed to include an evacuation orifice 24 known as a "vertical position" orifice.

As can be seen more precisely in FIG. 4, the cover 26 includes a network of gutters including gutters $30_1$ formed at the periphery of the central portion 27. These peripheral gutters $30_1$ communicate with two transverse gutters $30_2$ for receiving a centering piece 32 of the heat exchanger, as can be seen clearly in FIG. 1.

The gutters $30_1$ communicate with at least one, and in the example shown two, evacuation orifices 34 referred to as "upside-down horizontal position" orifices, formed at the junction plane of the inclined wall 28 at each corner of the plate 27. The orifices 34 are intended to evacuate condensates when the apparatus 1 occupies a given position, e.g. the position shown in FIG. 5D and defined as being between the vertical position (FIG. 5C) and an upside-down horizontal position (FIG. 5E).

As can be seen more clearly in FIG. 5D, condensates are collected by the central portion 27 of the cover and then conveyed into the gutters $30_1$ so as to be evacuated through the orifices 34. Advantageously, the gutters $30_1$ communicate with at least one, and in the example shown two, evacuation orifices 35 referred to as "sloping upside-down horizontal position" orifices that are formed in the corners opposite to those that include the orifices 34.

The means for collecting and evacuating condensates are also constituted by means of a wall such as a deflector plate 37 extending substantially from the cover 26 towards the plate 16 in a plane substantially parallel to the plane of the deflector 22. This plate 37 which is shown in dashed lines in FIG. 2 extends between the heat exchanger and the fans 6 and 6', directly overlying the air inlets of the fans (not shown). Advantageously, the plate 37 also extends to overlie the motor 7, leaving a communication passage 38 on either side of its lateral edges.

The plate 37 prevents the condensates penetrating into the air inlets of the fans 6 and 6' when the apparatus 1 occupies a given position, e.g. that shown in FIG. 5F and defined as lying between the upside-down horizontal position (FIG. 5E) and an upside-down vertical position (FIG. 5G). In the inclined position shown in FIG. 5F, the deflector plate 37 directs the condensates towards the cover 26 which serves to collect them by means of its gutters $30_1$ and $30_2$, for the purpose of evacuating them via the orifices 35. In this position, it should be observed that a fraction of the condensates which falls into the communication passage 38 is collected directly by the cover 26.

Figure 6:
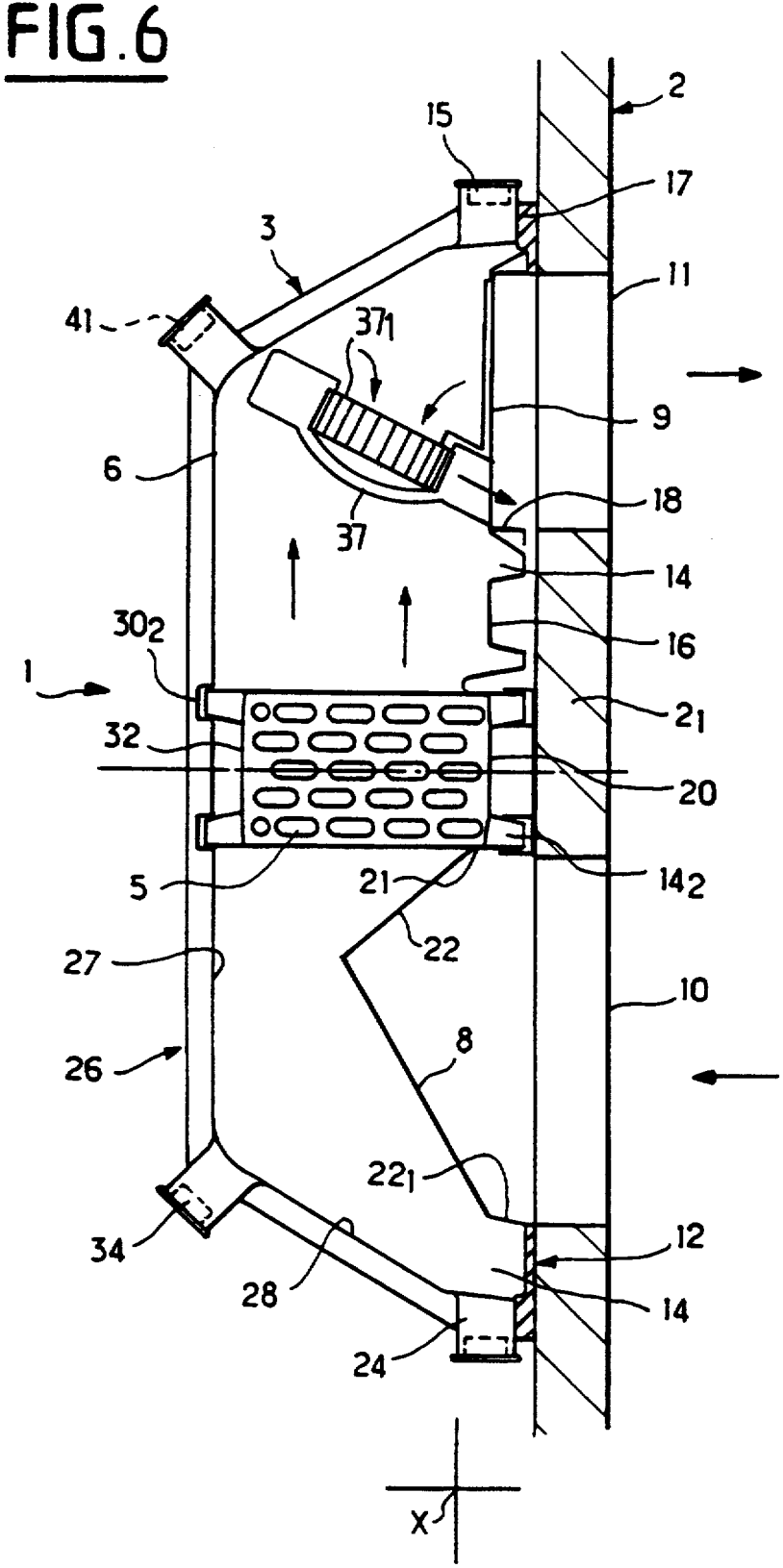
FIG. 6 is a section view showing a variant embodiment of the apparatus of the invention.

As shown in FIG. 6, it should be observed, that the deflector wall 37 may be constituted directly by the body for protecting a turbine that combines a motor and a fan. Such a turbine is in the form of a one-piece body having a suction inlet $37_1$ provided on the body opposite to the heat exchanger 5. The turbine extends from the soleplate 18 away from the heat exchanger at an angle substantially of the order of 45°, so as to deflect condensates and prevent them from penetrating into the turbine via the inlet $37_1$.

As can be seen more clearly in FIGS. 3, 4, and 5G, the cover 26 also includes a collecting wall 39 identical to the sloping wall 28 and connected thereto via sloping lateral walls 40 that together form a rim or peripheral edge of the cover 26. Naturally, the cover 26 is mounted in sealed manner on the chassis 12. At its free terminal portion, the collecting wall 39 includes the two orifices 15 formed at corners opposite to those including the orifices 24. The collecting wall 39 is designed to collect condensates when the apparatus is occupying an upside-down vertical position (FIG. 5G), a fraction of which condensates come directly from the heat exchanger passing via the communication passage 38. The remainder of the condensates are deflected by the plate 37 and are conveyed towards the soleplate 18, passing around the outlet duct 19 of each fan in order to be evacuated via the orifices 15.

When the apparatus 1 occupies a given position, e.g. that shown in FIG. 5H and defined as being between the upside-down vertical position (FIG. 5G) and the horizontal position (FIG. 5A), the condensates are collected via the top surface of the soleplate 18 and via the channels 14 of the plate 16.

The apparatus of the invention can thus be installed on an enclosure in any of the positions taken relative to the mounting axis X as described above with reference to the figures. The apparatus of the invention can also occupy any of the positions that can be taken up relative to a vertical mounting axis Y. Depending on the installation position, condensates are collected by the chassis. The apparatus can also be placed in any position that can be taken up relative to the horizontal axis Z perpendicular to the other two axes X and Y. In these positions, the condensates are mainly collected by the lateral walls 40 of the cover 26. The means of the invention for collecting and evacuating condensates thus enable the cooler apparatus to be mounted in any disposition on an enclosure. Such "universal" mounting is made even more universal in that the implementation of the collection and evacuation means on the housing 3 in fixed manner requires no particular adaptation of the apparatus as a function of an intended application.

Furthermore, when the cooler apparatus is installed on a vehicle, in particular earth-moving equipment, it should be observed that changes in the tilt of the apparatus do not prevent it from continuing to perform its function of evacuating condensates.

Naturally those evacuation orifices that are not used for evacuating condensates when the apparatus is adapted to a given position are closed by respective closure plugs 41.

It should also be observed, that even if the cooling liquid under pressure should leak out, none of that liquid can escape via the suction or blow openings.

The invention is not limited to the examples described and shown since various modifications can be made thereto without going beyond the ambit of the invention.

SUITABILITY FOR INDUSTRIAL APPLICATION

The cooler apparatus of the invention can be applied to cooling the cab of a vehicle.

I claim:

1. Cooler apparatus designed to be mounted on an enclosure (2) and comprising a housing (3) in which at least one fan (6, 6') and a heat exchanger (5) are mounted, the fan (6, 6') serving to cause air to circulate between a suction inlet (8) for air to be treated and a delivery outlet (9) for treated air, the apparatus being associated, in particular, with means for collecting and evacuating the condensates that result from air passing through the heat exchanger, wherein the housing (3) is provided internally with fixed means for collecting (12, 22, 26, 37, 39) and evacuating (15, 24, 34, 35) condensates in all positions in which the cooler apparatus may be mounted, said collecting and evacuating means including:

a chassis (12):

lying in a plane substantially parallel to a mounting axis (X);

having the heat exchanger extending therefrom:

organized to include a network of condensate recovery channels (14) opening out to at least one condensate evacuation orifice (15) referred to as a "horizontal position" orifice: and provided with a condensate deflector (22) extending in sloping manner towards the inside of the housing, between the heat exchanger and the suction inlet:

and a sloping roll (28):

projecting from the chassis to a height that is not less than the height of the heat exchanger and in the opposite direction to the deflector (22); and fitted at the chassis with an evacuation orifice (24) referred to as a "vertical position" orifice.

2. Apparatus according to claim 1, characterized in that the sloping wall (28) is an integral portion of a cover (26) including a central portion (27) extending in a plane substantially parallel to the plane containing the chassis and located relative to the heat exchanger on the side thereof that is opposite to its side occupied by the chassis (12), the central portion including a network of gutters (30$_1$, 30$_2$) communicating at each end of the central portion with at least one evacuation orifice (34, 35) referred to as an "upside-down horizontal position" orifice.

3. Apparatus according to claim 1, characterized in that the gutters (30$_1$) and/or the channels (14$_2$) serve to center the heat exchanger (5).

4. Apparatus according to claim 1, characterized in that the condensate collector means are constituted by a condensate deflector wall (37) extending from the cover (26) between the heat exchanger and the fan, overlying the air inlet passage of the fan.

5. Apparatus according to claim 4, characterized in that the deflector plate (37) also extends to overlie a motor (7) for driving the fan.

6. Apparatus according to claim 2, characterized in that the portion of the cover (26) opposite to its portion fitted with the "vertical position" evacuation orifice (24) includes an evacuation orifice (15) referred to as an "upside-down vertical position" orifice, communicating with a collector wall (39) extending in relationship with the fan (6) whose air outlet is connected in sealed manner to the chassis.

7. Apparatus according to claim 6, characterized in that the cover (26) includes two sloping lateral walls (40) co-operating with the collector walls (28 and 39) to form a peripheral edge mounted in sealed manner on the chassis (12).

8. Apparatus according to claim 1, characterized in that the chassis (12) is constituted by a soleplate (18) for supporting the fan and by a plate (16) shaped to include the network of channels (14) that are established in relationship to the heat exchanger and the fan, the soleplate (18) and the plate (16) being covered by a protective lid (17).

9. Apparatus according to claim 8, characterized in that the chassis (12) is made as a single piece.

* * * * *